(12) United States Patent
Lin

(10) Patent No.: US 11,473,656 B2
(45) Date of Patent: Oct. 18, 2022

(54) LINEAR ACTUATOR

(71) Applicant: TIMOTION TECHNOLOGY CO., LTD., New Taipei (TW)

(72) Inventor: Yu-Chang Lin, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 66 days.

(21) Appl. No.: 17/243,551

(22) Filed: Apr. 28, 2021

(65) Prior Publication Data

US 2022/0290744 A1    Sep. 15, 2022

(30) Foreign Application Priority Data

Mar. 9, 2021   (TW) .................................. 110202475

(51) Int. Cl.
*F16H 25/20*    (2006.01)
*F16H 57/02*    (2012.01)
*G05G 5/06*    (2006.01)

(52) U.S. Cl.
CPC ............ *F16H 25/20* (2013.01); *F16H 57/02* (2013.01); *G05G 5/065* (2013.01); *F16H 2025/2031* (2013.01); *F16H 2025/2071* (2013.01); *F16H 2025/2081* (2013.01); *F16H 2057/02034* (2013.01); *F16H 2057/02069* (2013.01)

(58) Field of Classification Search
CPC ............ F16H 25/20; F16H 2025/2031; F16H 2025/2071; F16H 2025/2081; F16H 2057/02034; F16H 2057/02069; F16H 57/02; G05G 5/065; G05G 5/00; G05G 5/06; Y10T 74/20636

USPC .......................................................... 74/527
See application file for complete search history.

(56) References Cited

U.S. PATENT DOCUMENTS

| | | | |
|---|---|---|---|
| 4,858,491 A * | 8/1989 | Shube | B64C 13/341 192/141 |
| 8,156,834 B2 * | 4/2012 | Chiang | F16H 25/20 74/89.39 |
| 2008/0134815 A1 * | 6/2008 | Larsen | F16D 11/14 74/89.34 |

(Continued)

FOREIGN PATENT DOCUMENTS

CN        204148569 U    *  2/2015

*Primary Examiner* — William C Joyce
*Assistant Examiner* — Gregory T Prather
(74) *Attorney, Agent, or Firm* — Chun-Ming Shih; HDLS IPR SERVICES

(57) ABSTRACT

The disclosure is a linear actuator. A transmission mechanism includes a motor, a gear set and a screw rod. A releasing mechanism is disposed between the gear set and the screw rod and includes a driving gear, a first clutch, a second clutch and a sliding sleeve. A toggle restraining mechanism includes a stem, a rotating element and a restraining assembly. The rotating element has a restraining hole and a rotating arm. The restraining assembly includes a restraining presser, a restraining spring and an engaging element. The stem is moved to rotate the rotating element, the rotating arm is rotated with the rotating element to push the sliding sleeve. The sliding sleeve is pushed by the rotating arm to separate from the second clutch. The engaging element is engaged in the restraining hole to restrain the rotating element from rotating when the rotating element is rotated to a specific angle.

17 Claims, 11 Drawing Sheets

(56) References Cited

U.S. PATENT DOCUMENTS

| | | | | |
|---|---|---|---|---|
| 2008/0210029 A1* | 9/2008 | Wang | ............ | F16H 25/20 |
| | | | | 74/89.38 |
| 2012/0096963 A1* | 4/2012 | Hung | ............ | F16H 25/2454 |
| | | | | 74/89.38 |
| 2014/0182405 A1* | 7/2014 | Wu | ............ | F16H 25/20 |
| | | | | 74/89.32 |
| 2014/0260730 A1* | 9/2014 | Wu | ............ | F16H 25/20 |
| | | | | 74/89.23 |
| 2014/0312724 A1* | 10/2014 | Hung | ............ | H02K 7/06 |
| | | | | 310/78 |
| 2016/0017966 A1* | 1/2016 | Wu | ............ | F16H 25/2025 |
| | | | | 74/89.38 |
| 2017/0253145 A1* | 9/2017 | Runde | ............ | B60N 2/123 |
| 2019/0055996 A1* | 2/2019 | Avdusinovic | ............ | F16D 23/14 |
| 2019/0195323 A1* | 6/2019 | Lu | ............ | F16H 57/0025 |
| 2020/0270928 A1* | 8/2020 | Gumbo | ............ | E05F 15/611 |
| 2020/0300325 A1* | 9/2020 | Vine | ............ | G05D 15/01 |

* cited by examiner

LINEAR ACTUATOR

BACKGROUND

Technical Field

The disclosure relates to a linear actuator, particularly to a linear actuator with a quick-releasing mechanism.

Related Art

Linear actuators have been widely applied in medical equipment such as hospital beds and electric chairs. In addition, in order to deal with a medical emergency, linear actuators are installed with a quick-releasing mechanism to make a telescopic tube of actuator be capable of rapidly retracting. Thus, fast adjustments and changes can be implemented.

Furthermore, a related-art quick-releasing mechanism utilizes a pulling rod or rope to drive the rotating element to engage and disengage and finally to interrupt the transmission of torque, so that an effect of quick release can be accomplished. However, when the related-art quick-releasing mechanism is used, the pulling rod or rope must be forced to keep the status of transmission interruption. This causes inconvenience in use.

In view of this, the inventors have devoted themselves to the above-mentioned related art, researched intensively and cooperated with the application of science to try to solve the above-mentioned problems. Finally, the disclosure which is reasonable and effective to overcome the above drawbacks is provided.

SUMMARY

An object of the disclosure is to provide a linear actuator with a restrainable quick-releasing mechanism, which may restrain the releasing mechanism to keep a status of quick release.

To accomplish the above object, the linear actuator with a restrainable quick-releasing mechanism of the disclosure includes a transmission mechanism, a releasing mechanism and a toggle restraining mechanism. The transmission mechanism includes a motor, a gear set driven by the motor and a screw rod driven by the gear set. The releasing mechanism is disposed between the gear set and the screw rod and includes a driving gear connecting the gear set, a first clutch associated on the driving gear, a second clutch associated on the screw rod, and a sliding sleeve being connectable with the first clutch and the second clutch. The toggle restraining mechanism is disposed on a side of the releasing mechanism and includes a stem, a rotating element driven by the stem and a restraining assembly. The rotating element includes a restraining hole and a rotating arm. The restraining assembly includes a restraining presser associated on the rotating element, a restraining spring disposed in the restraining presser and an engaging element elastically pushed by the restraining spring. The stem is moved by an external force to rotate the rotating element. The rotating arm is rotated with the rotating element to push the sliding sleeve. The sliding sleeve is pushed by the rotating arm to separate from the second clutch. The engaging element is engaged in the restraining hole to restrain the rotating element from rotating when the rotating element is rotated to a specific angle.

In comparison with the related art, the linear actuator of the disclosure is provided with a toggle restraining mechanism including a stem, a rotating element and a restraining assembly. The stem is moved by an external force to rotate the rotating element so as to make the rotating arm push the sliding sleeve to make the second clutch be disengaged from transmission to interrupt the transmission. Also, at the same time, the engaging element is engaged to restrain the rotation of the rotating element to accomplish the effect of restraining the releasing mechanism. Thus, a status of quick release may be kept without an external force and the utility of the disclosure is increased.

BRIEF DESCRIPTION OD THE DRAWINGS

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
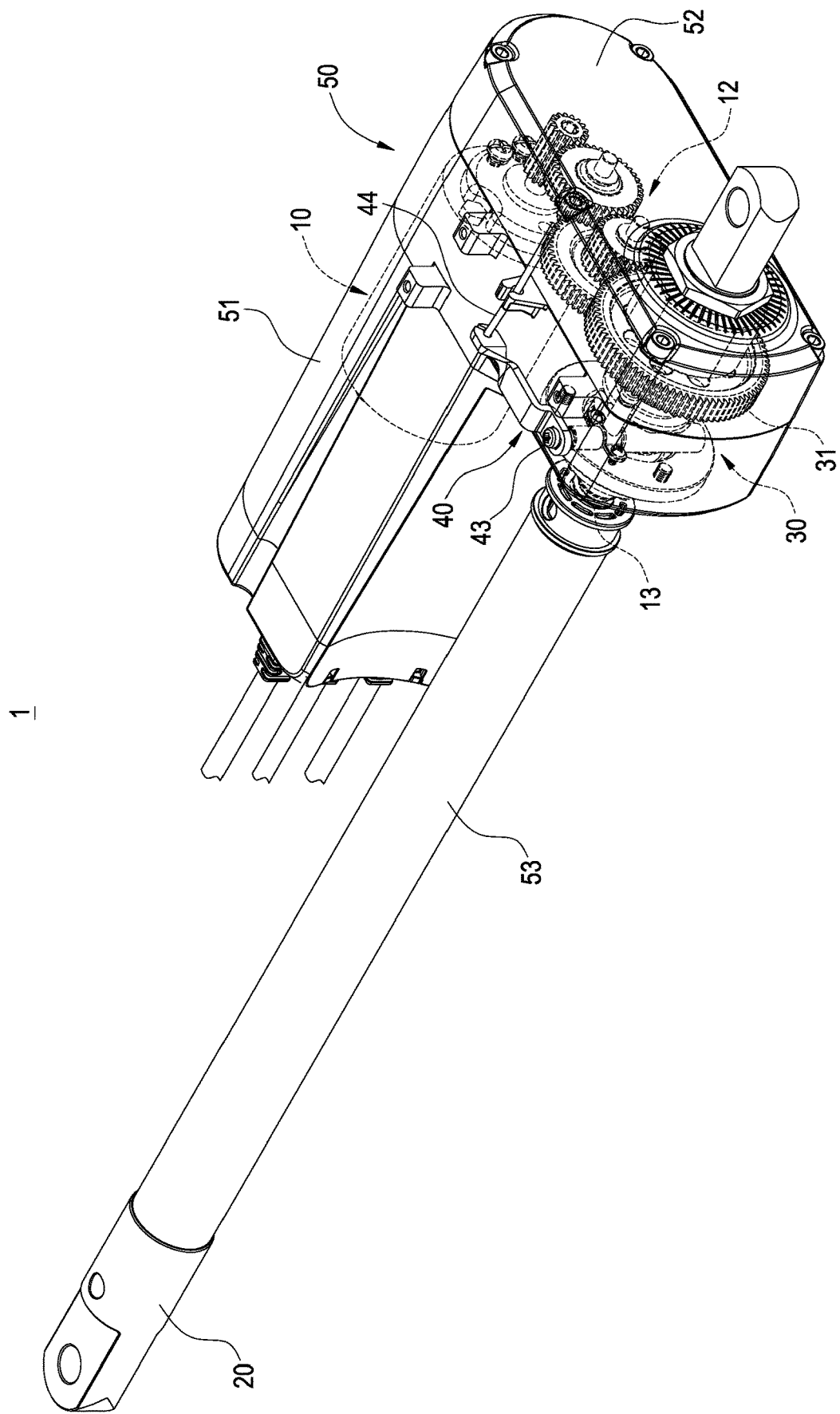
FIG. 1 is a perspective view of the linear actuator with a restrainable releasing mechanism of the disclosure.

Please refer to FIG. 1, which is a perspective view of the linear actuator with a restrainable quick-releasing mechanism of the disclosure. The linear actuator 1 of the disclosure includes a transmission mechanism 10, a telescopic tube 20, a releasing mechanism (quick-releasing mechanism) 30 and a toggle restraining mechanism 40. The telescopic tube 20 and the releasing mechanism 30 connect to the transmission mechanism 10. The toggle restraining mechanism 40 controls the operation of the releasing mechanism 30 and restrains the releasing mechanism 30. In the embodiment, the linear actuator 1 further includes a housing 50. The housing 50 includes a motor case 51, a gear case 52 and an outer tube 53. The details of the linear actuator 1 are described below.

Please refer to FIGS. 2-5, which are a partially perspective schematic view, an exploded view, an exploded view of the toggle restraining mechanism and another partially perspective schematic view of the linear actuator of the disclosure, respectively. In the embodiment, the transmission mechanism 10 includes a motor 11, a gear set 12 driven by the motor 11 and a screw rod 13 driven by the gear set 12. The motor 11 is disposed in the motor case 51. The gear case 52 covers the gear set 12. The screw rod 13 is sheathed by the outer tube 53.

The telescopic tube 20 connects to the screw rod 13 and is driven by the screw rod 13 to perform the reciprocating motion.

Figure 3:
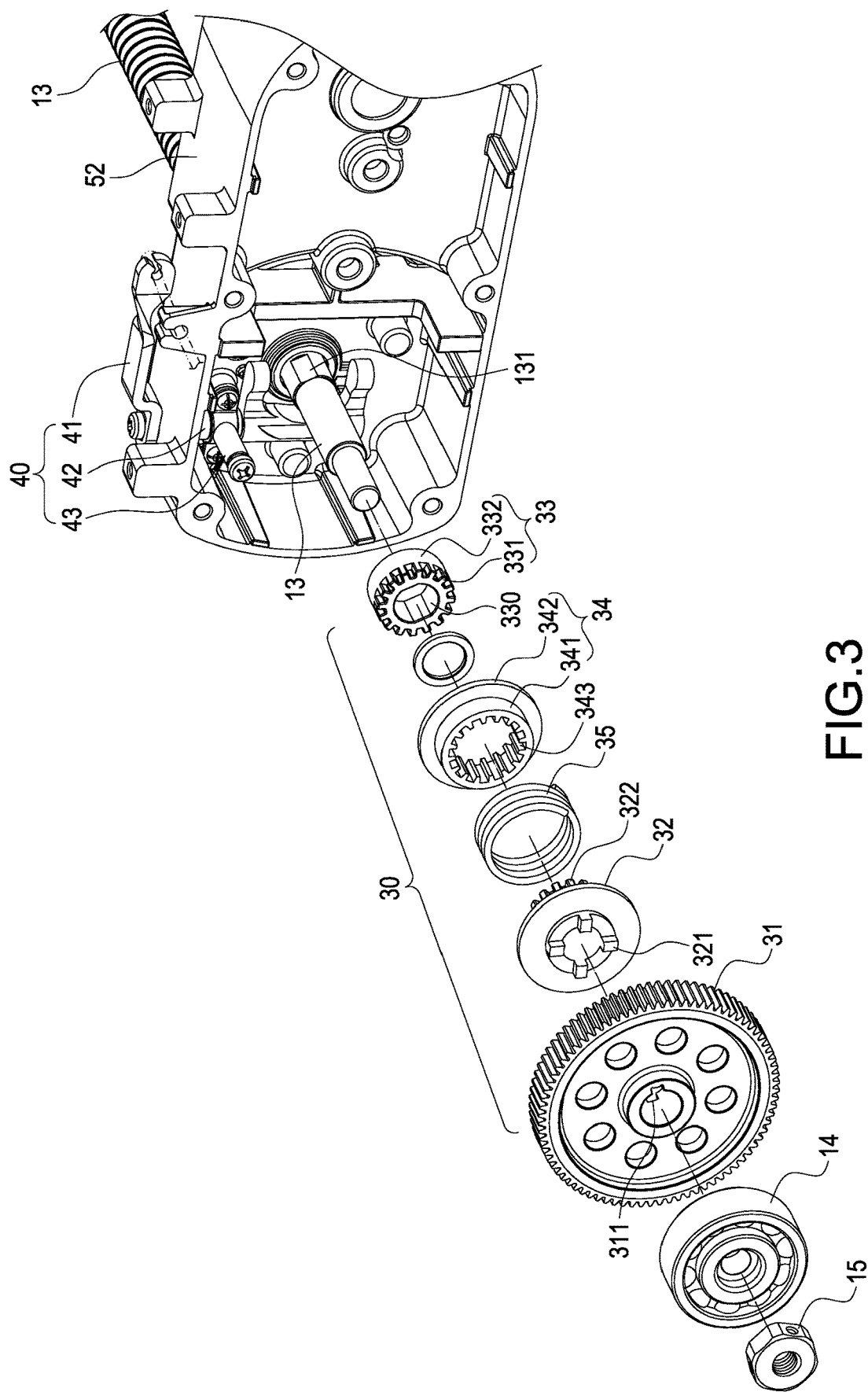
FIG. 3 is an exploded view of the releasing mechanism of the disclosure.

The releasing mechanism 30 is disposed between the gear set 12 and the screw rod 13 as shown in FIG. 1. As shown in FIG. 3, the releasing mechanism 30 includes a driving gear 31 connected to the gear set 12, a first clutch 32 associated on the driving gear 31, a second clutch 33 associated on the screw rod 13, a sliding sleeve 34 being connectable with the first clutch 32 and the second clutch 33, and a return spring 35 disposed between the sliding sleeve 34 and the first clutch 32.

In this embodiment, the transmission 10 further includes a bearing 14 and a nut 15. The bearing 14 is axially passed by the screw rod 13 and is fixed on an outside of the driving gear 31 by the nut 15.

The toggle restraining mechanism 40 is disposed on a side of the releasing mechanism 30. As sown in FIG. 4, the toggle restraining mechanism 40 includes a stem 41, a rotating element 42 driven by the stem 41 and a restraining assembly 43. The rotating element 42 includes a restraining hole 421 and a rotating arm 422. The restraining assembly 43 includes a restraining presser 431 associated on the rotating element 42, a restraining spring 432 disposed in the restraining presser 431 and an engaging element 433 elastically pushed by the restraining spring 432. In some embodiments, the engaging element 433 is a steel ball.

Figure 7:
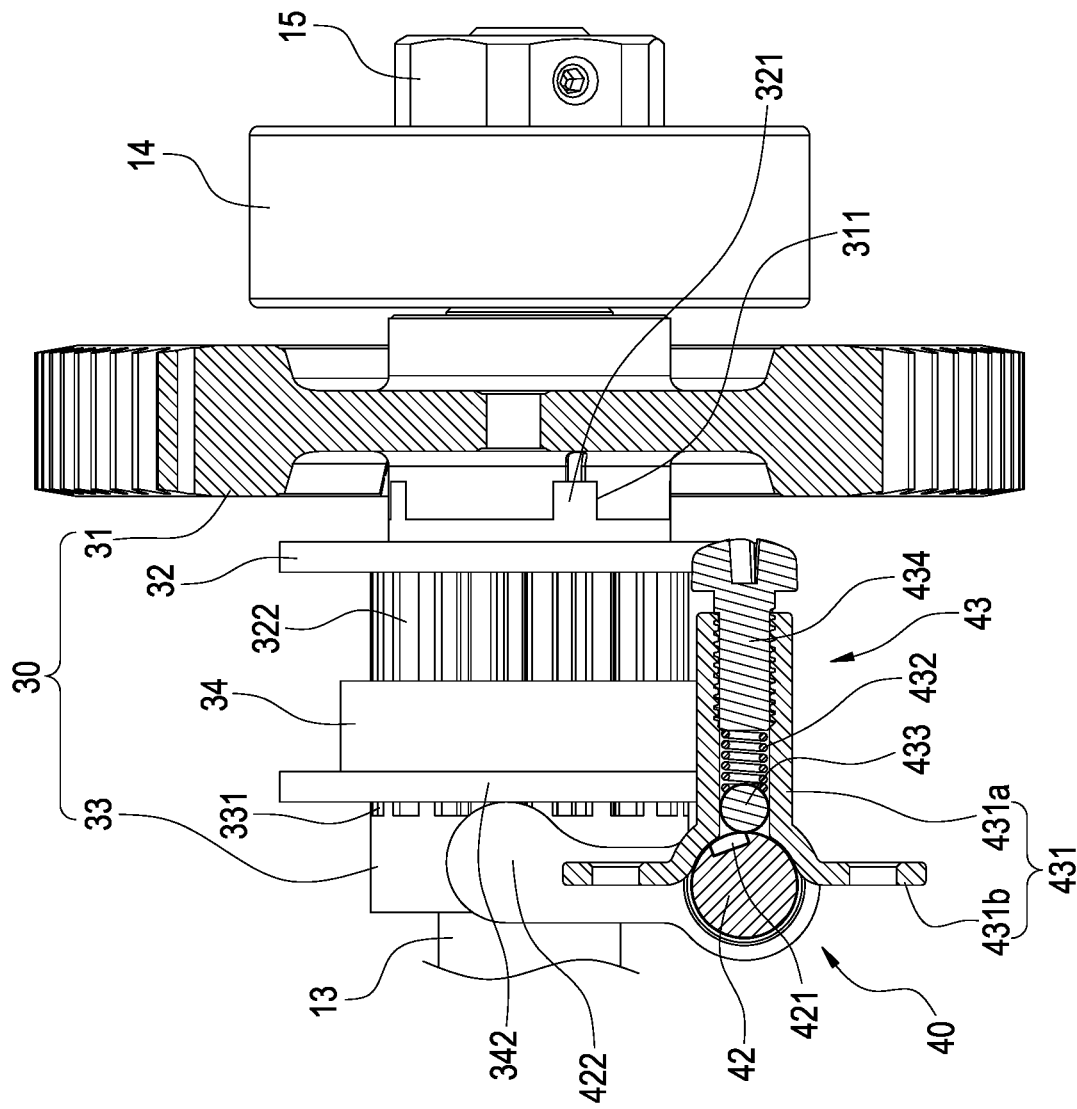
FIG. 7 is an assembling cross-sectional view of the releasing mechanism and the toggle restraining mechanism of the disclosure.

Please refer to FIG. 3. The driving gear 31 is a gear with a notch 311. In addition, a side of the first clutch 32, which faces the driving gear 31, is formed with a protrusion 321. The first clutch 32 is associated on the driving gear 31 by embedding the protrusion 321 into the notch 311 as shown in FIG. 7.

Moreover, the sliding sleeve 34 includes a hollow cylinder 341, a pushed annular plate 342 disposed around the hollow cylinder 341 and multiple sliding gears 343 formed in the hollow cylinder 341. The sliding sleeve 34 moves in a direction away from the second clutch 33 through the rotating arm 422 pushing the pushed annular plate 342.

In detail, a side of the first clutch 32, which faces the sliding sleeve 34, is formed with multiple first clutch gears 322. Also, a side of the second clutch 33, which faces the sliding sleeve 34, is formed with multiple clutch gears 331. Two sides of the sliding gears 343 engage with the first clutch gears 322 and the second clutch gears 331 respectively.

Figure 8:
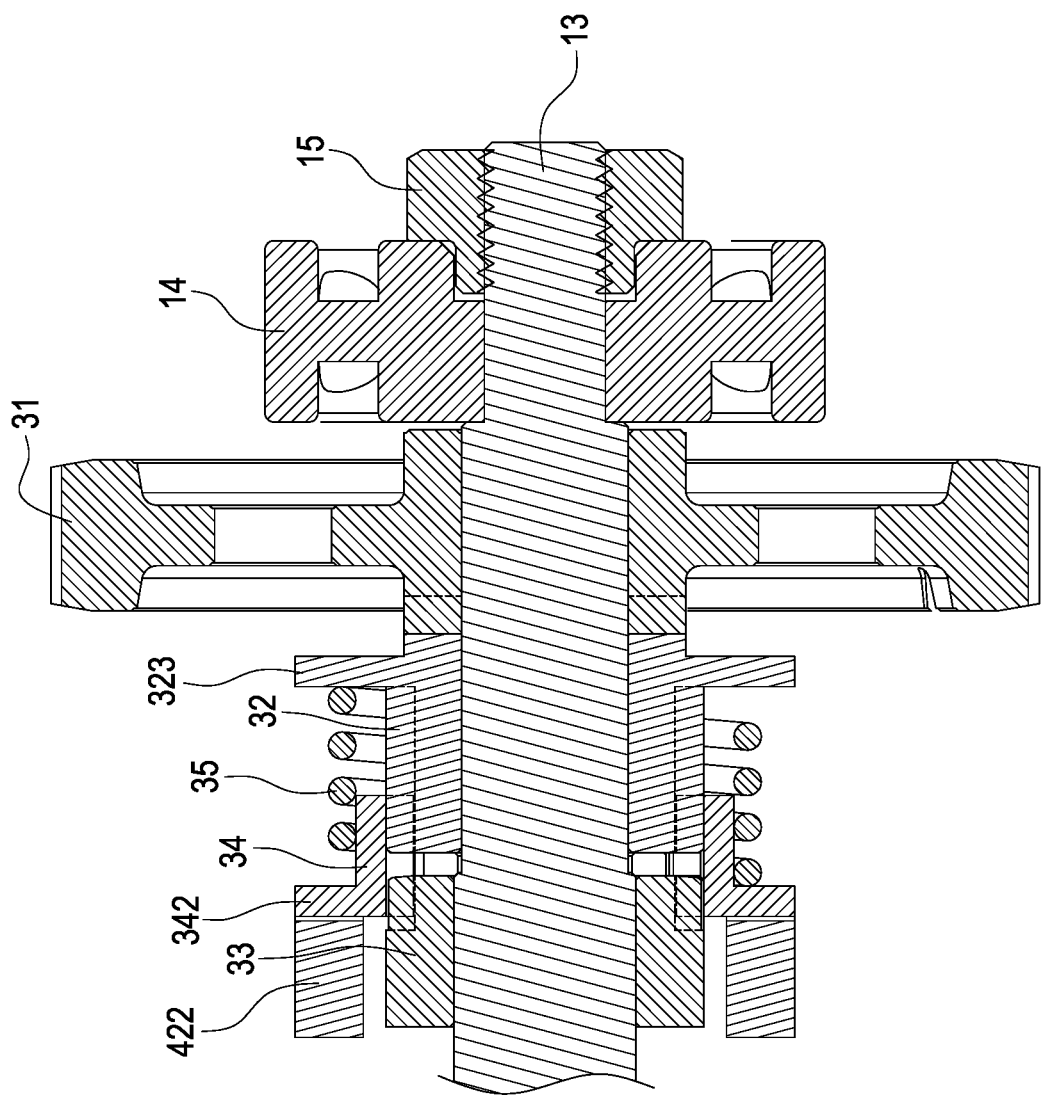
FIG. 8 is an assembling cross-sectional view of the releasing mechanism and the screw rod of the disclosure.

In this embodiment, the screw rod 13 is formed with a positioning portion 131. The second clutch 33 includes an engaging sleeve 332 formed with the second clutch gears 331. The engaging sleeve 332 is formed with an engaging hole 330 corresponding to the positioning portion 131. The second clutch 33 and the screw rod 13 are associated through the engaging hole 330 and the positioning portion 131 being positioned with each other. Besides, the first clutch 32 is formed with a first annular plate 323. Two sides of the return spring 35 elastically abut against the pushed annular plate 342 and the first annular plate 323 respectively as shown in FIG. 8.

Figure 2:
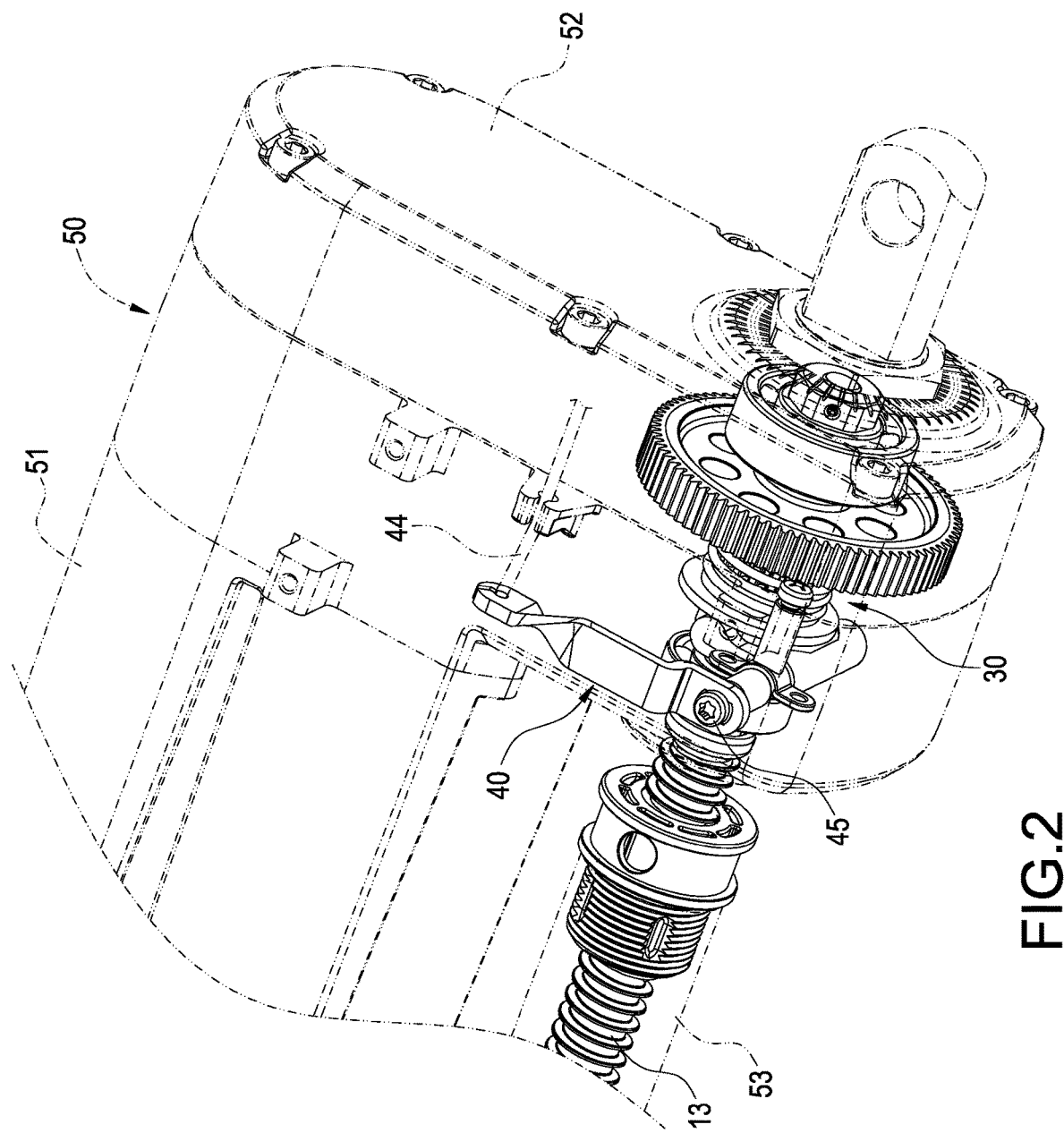
FIG. 2 is a partially perspective schematic view of the linear actuator of the disclosure.

In this embodiment, the toggle restraining mechanism 40 further includes a pulling element 44 and a fixing element 45. The pulling element 44 may be a pulling rod or rope as shown in FIG. 1 or FIG. 2.

Figure 4:
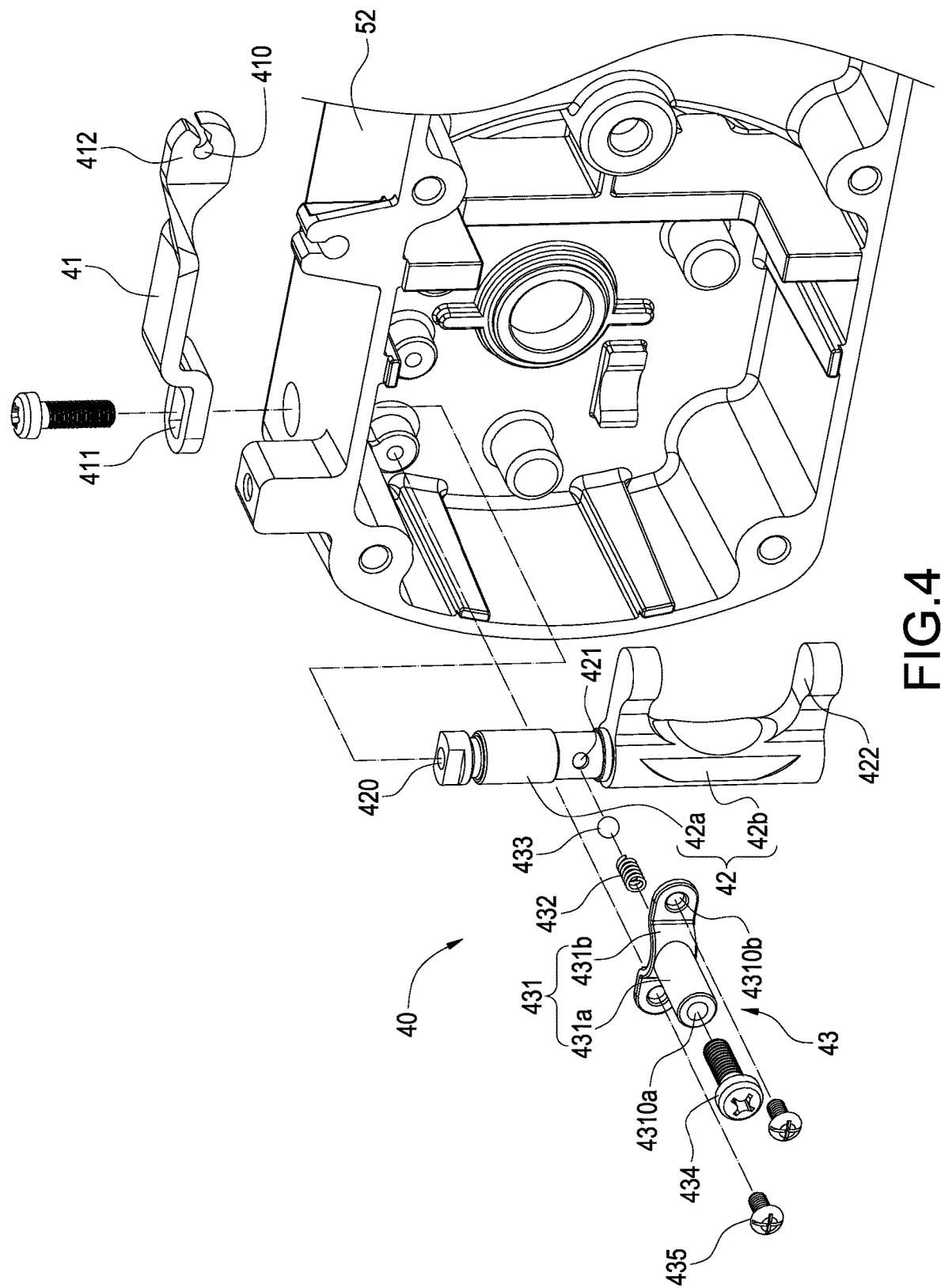
FIG. 4 is an exploded view of the toggle restraining mechanism of the disclosure.
Figure 5:
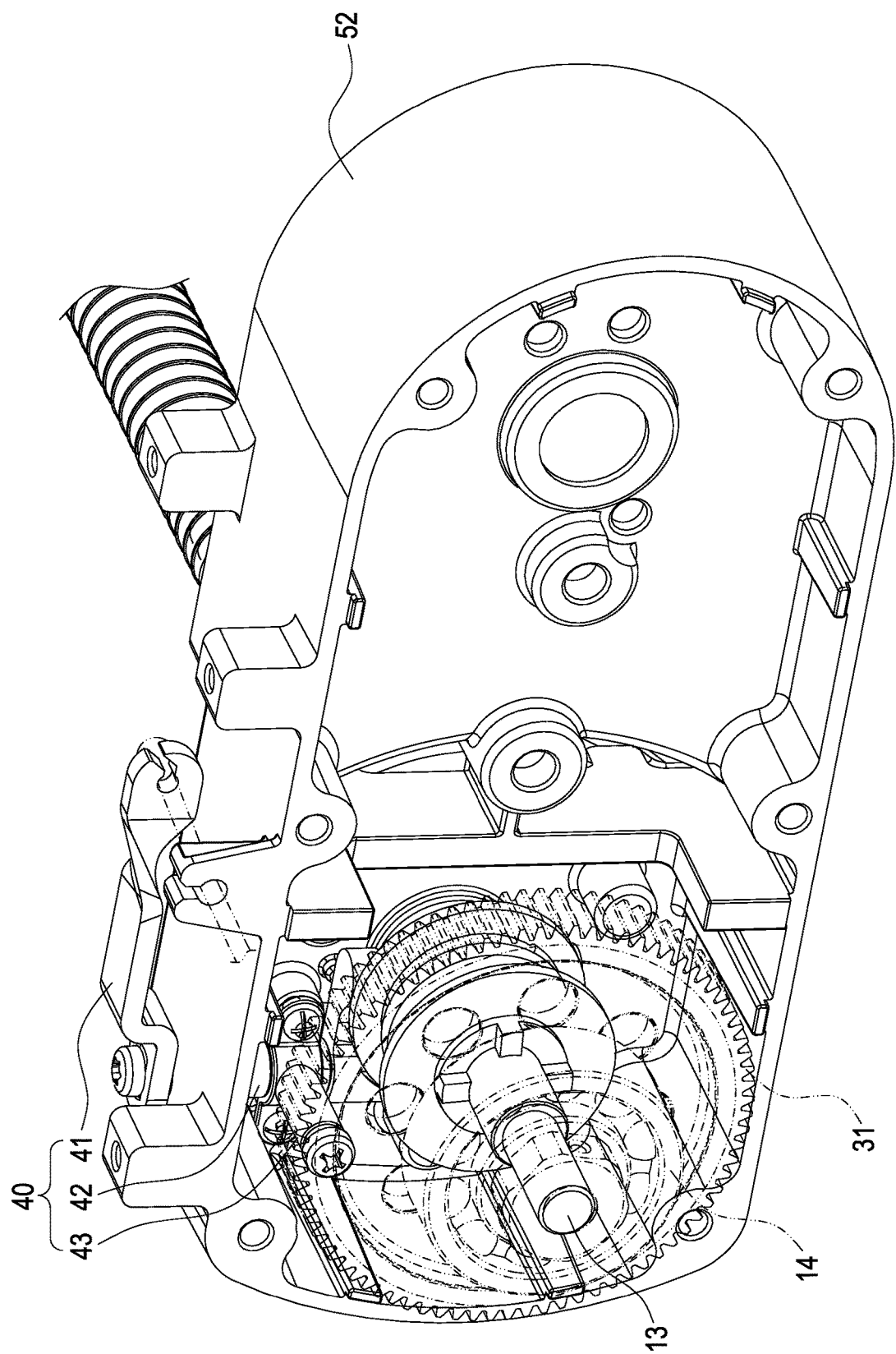
FIG. 5 is another partially perspective schematic view of the linear actuator of the disclosure.

Please refer to FIG. 4. An end of the stem 41 is formed with a through hole 410. The pulling element 44 passes through the through hole 410 and is connected to the stem 41. In addition, the stem 41 is further formed with a passing hole 411, and the rotating element 42 is formed with a connecting hole 420. The stem 41 is connected to the rotating element 42 by the fixing element 45 passing the passing hole 411 and the connecting hole 420.

An end of the stem 41, which is passed by the pulling element 44, is formed with an upright plate 412 for the pulling element 44 to pass through.

In an embodiment, the rotating element 42 includes a restraining rod 42a and a swaying plate 42b connected to the restraining rod 42a. The restraining rod 42a is formed with the restraining hole 421. The swaying plate 42b is formed with the rotating arm 422. The restraining presser 431 includes a restraining cylinder 431a and a pressing plate 431b connected with the restraining cylinder 431a. The restraining cylinder 431a is positioned on the restraining rod 42a, and both the restraining spring 432 and the engaging element 433 are disposed in the restraining cylinder 431a.

In this embodiment, the restraining assembly 43 further includes an adjusting screw 434 and multiple fixing screws 435. The restraining cylinder 431a is formed with an adjusting hole 4310a. The adjusting screw 434 is inserted into the adjusting hole 4310a and abuts against the restraining spring 432. The elastic pressure of the restraining spring 432 to the engaging element 433 may be adjusted by the adjusting screw 434.

Further, two sides of the pressing plate 431b are formed with a fixing hole 4310b respectively. The restraining presser 431 is fixed by associating the fixing screws 435 separately with the fixing holes 4310b.

Figure 6:
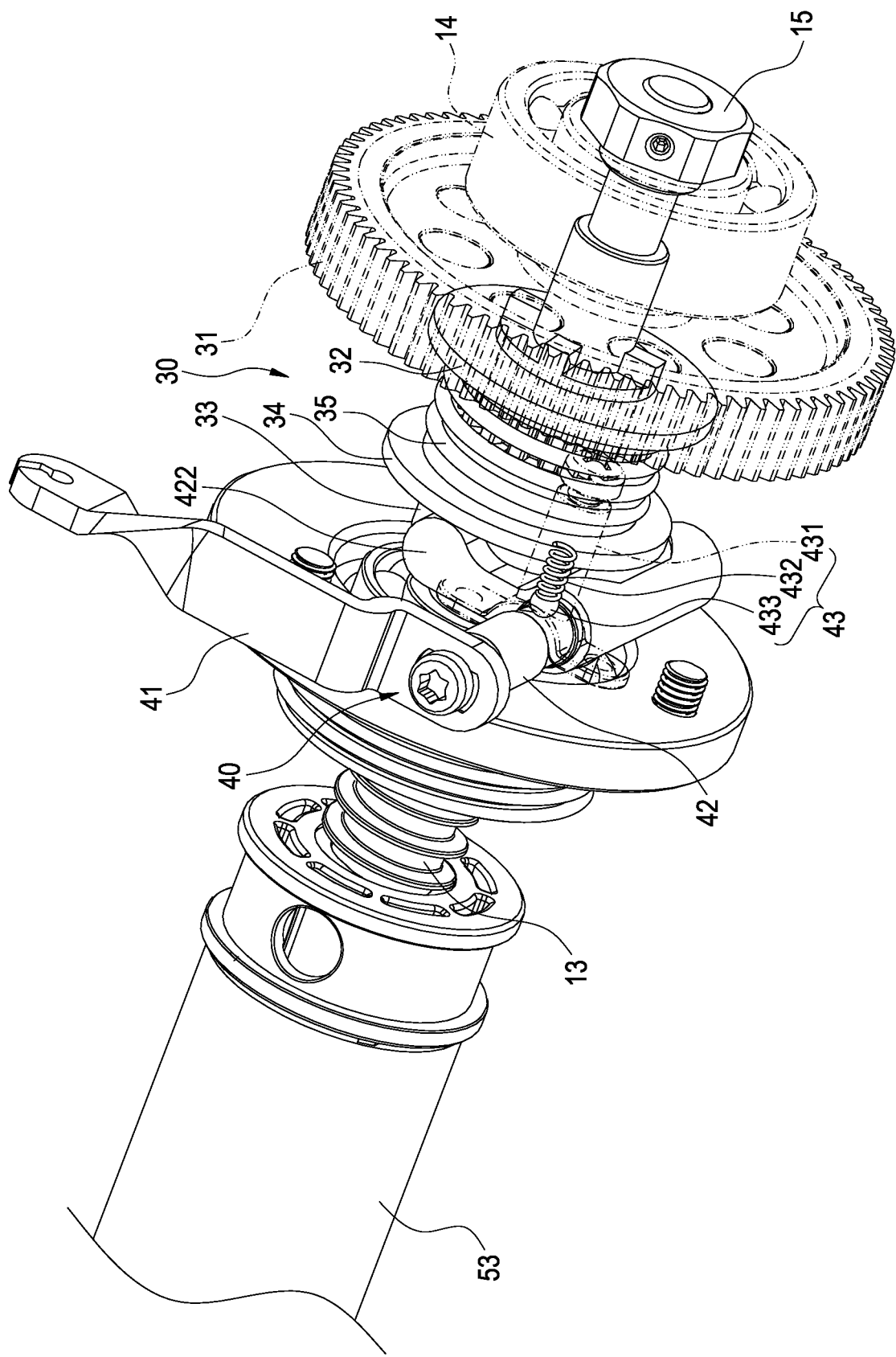
FIG. 6 is an assembling schematic view of the releasing mechanism and the toggle restraining mechanism of the disclosure.

Please refer to FIGS. 6-8, which are an assembling schematic view of the releasing mechanism and the toggle restraining mechanism, an assembling cross-sectional view of the releasing mechanism and the toggle restraining mechanism and an assembling cross-sectional view of the releasing mechanism and the screw rod of the disclosure, respectively. As shown in FIG. 6, when the linear actuator with a restrainable quick-releasing mechanism of the disclosure is assembled as abovementioned, the releasing mechanism 30 is installed at a rear end of the screw rod 13. The toggle restraining mechanism 40 is disposed on a side of the releasing mechanism 30 to control the operation of the releasing mechanism 30 and to accomplish the object of restraining the releasing mechanism 30.

As shown in FIG. 7, when the toggle restraining mechanism 40 is not actuated by an external force, the sliding sleeve 34 engages with the first clutch 32 and the second clutch 33 on two sides. At the same time, the driving gear 31 rotates to drive the first clutch 32, the sliding sleeve 34 and the second clutch 33, which engage with each other, and further to rotate the screw rod 13. It is noted that the engaging element 433 of the restraining assembly 43 does not fall into the restraining hole 421 of the rotating element 42.

Please refer to FIG. 8. In this embodiment, the return spring 35 elastically abuts against between the sliding sleeve 34 and the first clutch 32. Thus, the sliding sleeve 34 is pushed by the return spring 35 so as to keep at a position of engaging with the second clutch 33.

Figure 9:
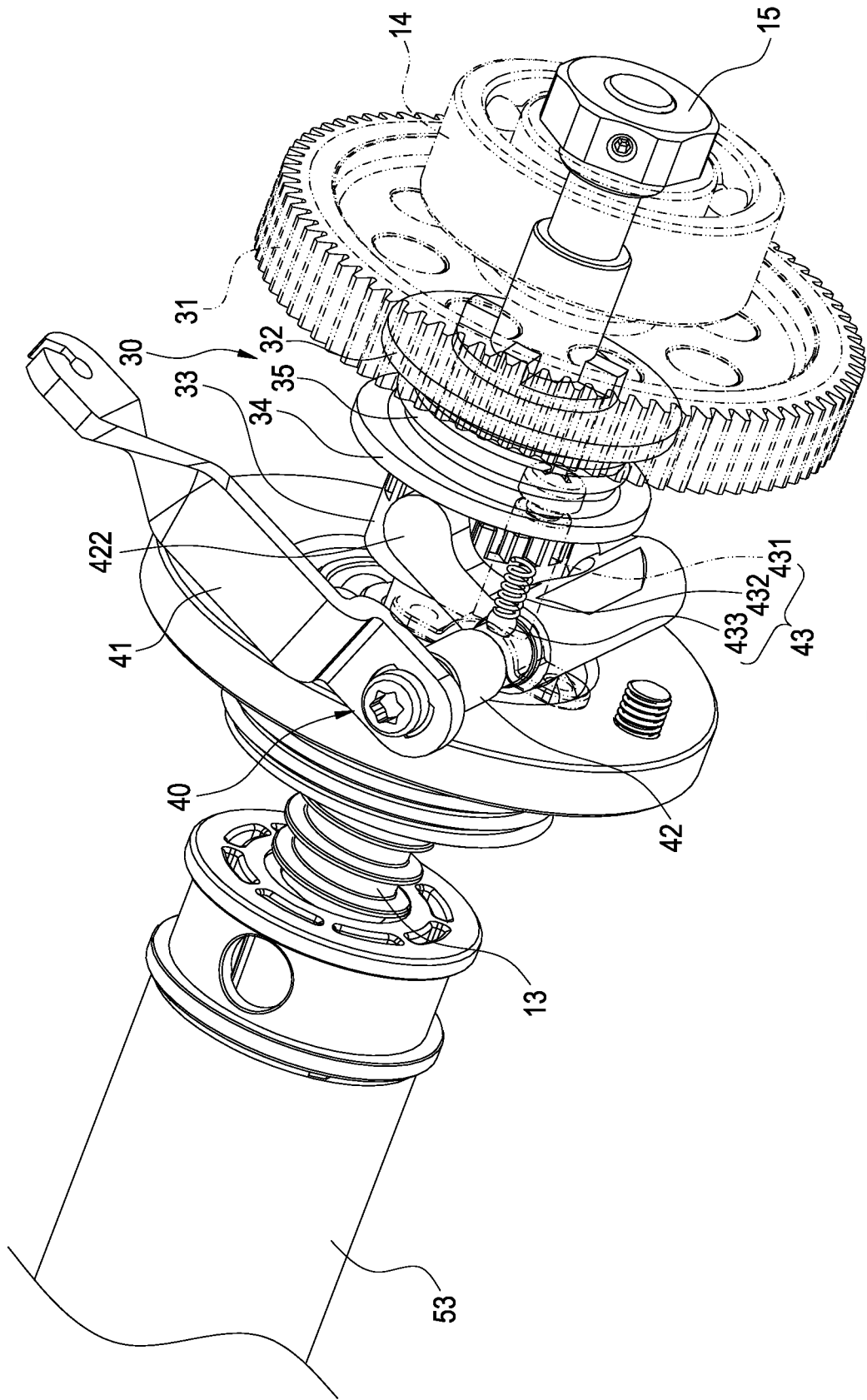
FIG. 9 is a schematic view of the disclosure, which depicts that the toggle restraining mechanism controls the releasing mechanism under an external force exerted.
Figure 10:
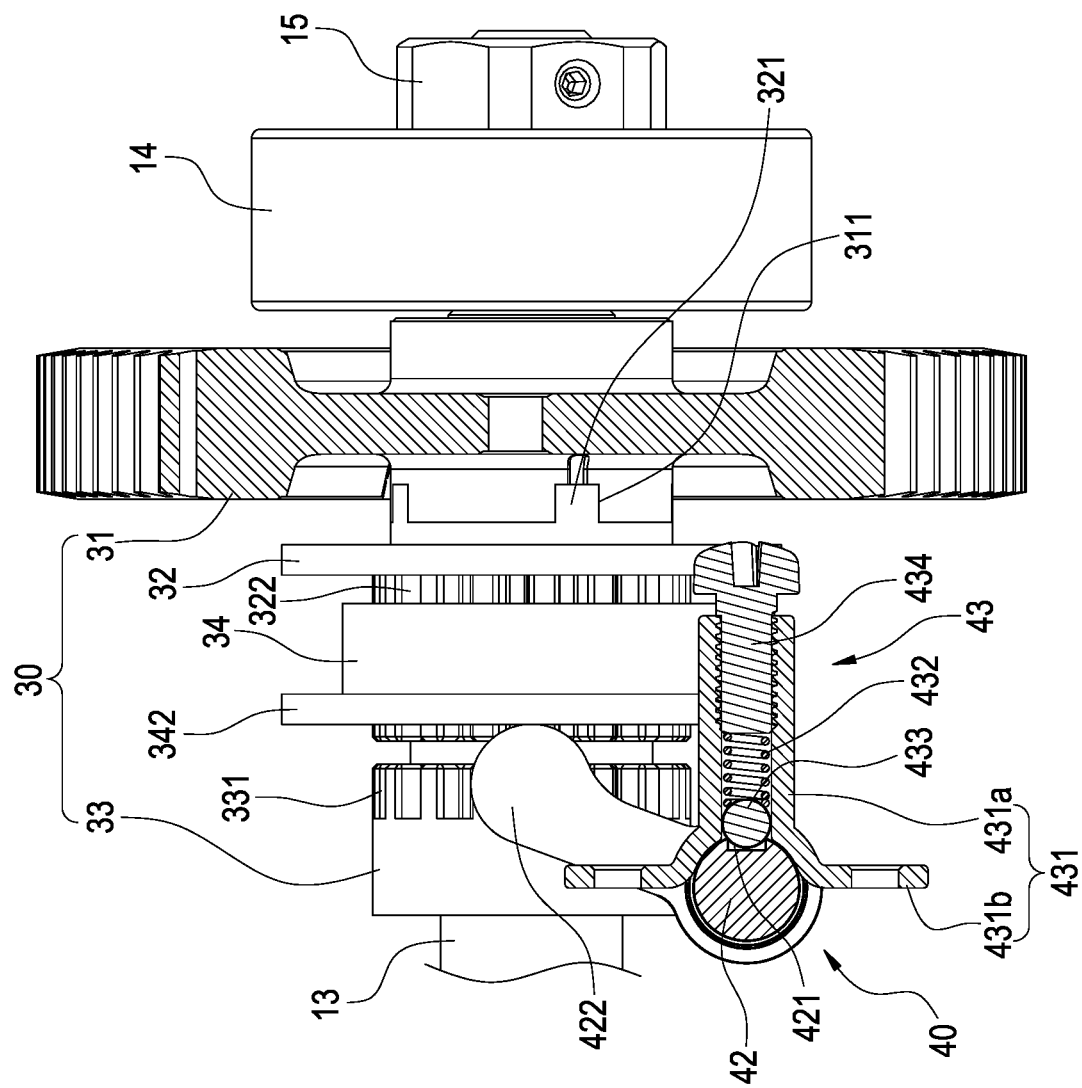
FIG. 10 is a cross-sectional schematic view of the disclosure, which depicts the releasing mechanism under the acting of the toggle restraining mechanism.
Figure 11:
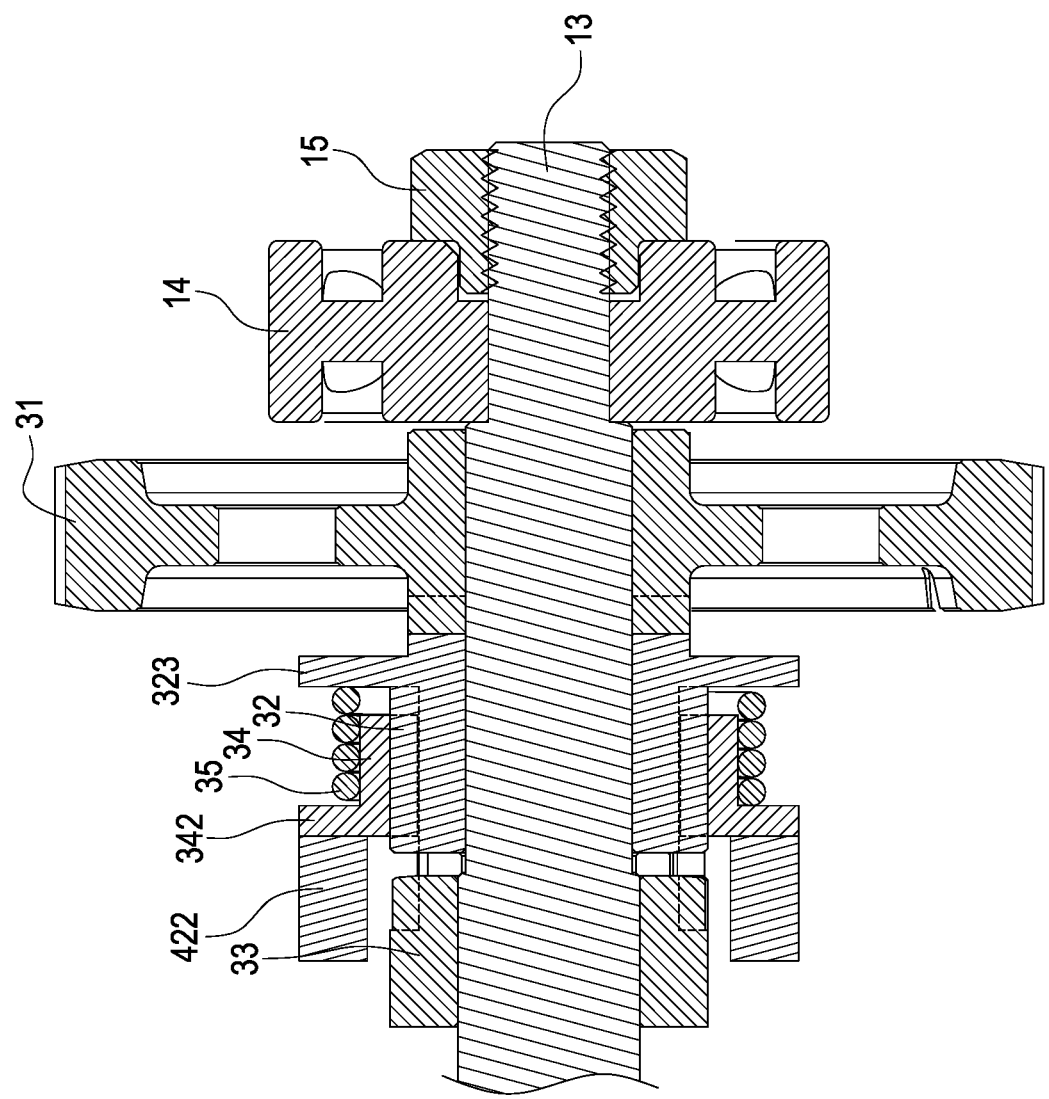
FIG. 11 is an assembling cross-sectional view of the releasing mechanism and the screw rod of the disclosure.

Please refer to FIGS. 9-11, which are a schematic view depicting that the toggle restraining mechanism controls the releasing mechanism under an external force exerted, a cross-sectional schematic view of the disclosure depicting the releasing mechanism under the acting of the toggle restraining mechanism and a cross-sectional view of the releasing mechanism of the disclosure assembled with the screw rod. As shown in FIG. 9, in this embodiment, the stem 41 is moved by an external force to rotate the rotating element 42. At the same time, the rotating arm 422 rotates with the rotating element 42 to push the sliding sleeve 34.

Also, please refer to FIG. 10. The rotating arm 422 pushes a side of the pushed annular plate 342 to make the sliding sleeve 34 move in a direction away from the second clutch 33. As a result, the sliding sleeve 34 is pushed by the rotating arm 422 to separate from the second clutch 33. That is, the second clutch 33 separates from the driving of the sliding sleeve 34 and the first clutch 32 to interrupt the transmission. Thus, the function of quick releasing may be implemented.

At the same time, the engaging element 433 is engaged in the restraining hole 421 to restrain the rotating element 42 from rotating when the rotating element 42 is rotated to a specific angle. Therefore, the releasing mechanism 30 is restrained so as to be kept in a status of quick releasing.

Please refer to FIG. 11. The rotating arm 422 presses the return spring 35 while the sliding sleeve 34 is being pushed by the rotating arm 422. Therefore, the sliding sleeve 34 is elastically pushed by the return spring 35, but the sliding sleeve 34 still keeps separating from the second clutch 33.

While this disclosure has been described by means of specific embodiments, numerous modifications and variations could be made thereto by those skilled in the art without departing from the scope and spirit of this disclosure set forth in the claims.

What is claimed is:

1. A linear actuator, comprising:
a transmission mechanism, comprising:
a motor;
a gear set, driven by the motor; and
a screw rod, driven by the gear set;
a releasing mechanism, disposed between the gear set and the screw rod, the releasing mechanism comprising:
a driving gear, connected with the gear set;
a first clutch, connected on the driving gear;
a second clutch, connected on the screw rod; and
a sliding sleeve, being connectable with the first clutch and the second clutch; and
a toggle restraining mechanism, disposed on a side of the releasing mechanism, the toggle restraining mechanism comprising:
a stem;
a rotating element, driven by the stem; and
a restraining assembly;
wherein the rotating element comprises:
a restraining hole; and
a rotating arm;
the restraining assembly comprises:
a restraining presser, connected on the rotating element;
a restraining spring, disposed in the restraining presser; and
an engaging element, elastically pushed by the restraining spring,
wherein the stem is moved by an external force to rotate the rotating element, the rotating arm rotates with the rotating element to push the sliding sleeve, the sliding sleeve is pushed by the rotating arm to separate from the second clutch, and the engaging element is engaged in the restraining hole to restrain the rotating element from rotating when the rotating element rotates to a specific angle.

2. The linear actuator of claim 1, further comprising: a housing, and the housing comprising:
a motor case, the motor disposed therein;
a gear case, covering the gear set; and
an outer tube, adapted to sheathe the screw rod.

3. The linear actuator of claim 1, wherein the transmission mechanism further comprises a bearing and a nut, and the bearing is passed through by the screw rod and is fixed on an outside of the driving gear by the nut.

4. The linear actuator of claim 1, wherein the releasing mechanism further comprises a return spring disposed between the sliding sleeve and the first clutch.

5. The linear actuator of claim 4, wherein the driving gear comprises a notch, a protrusion is disposed on a side of the first clutch facing the driving gear, and the first clutch is connected to the driving gear by embedding the protrusion into the notch.

6. The linear actuator of claim 4, wherein the sliding sleeve further comprises a hollow cylinder, a pushed annular plate surrounding the hollow cylinder and multiple sliding gears disposed in the hollow cylinder, and the sliding sleeve moves in a direction away from the second clutch through the rotating arm pushing the pushed annular plate.

7. The linear actuator of claim 6, wherein the first clutch comprises a first annular plate, and two sides of the return spring elastically abut against the pushed annular plate and the first annular plate respectively.

8. The linear actuator of claim 6, wherein multiple first clutch gears are disposed on a side of the first clutch facing the sliding sleeve, multiple second clutch gears are disposed on a side of the second clutch facing the sliding sleeve, and two sides of the sliding gears engage with the first clutch gears and the second clutch gears respectively.

9. The linear actuator of claim 8, wherein the screw rod comprises a positioning portion, the second clutch comprises an engaging sleeve that the second clutch gears are disposed thereon, the engaging sleeve comprises an engaging hole corresponding to the positioning portion, and the second clutch and the screw rod are associated by the engaging hole and the positioning portion being positioned with each other.

10. The linear actuator of claim 1, wherein the toggle restraining mechanism further comprises a pulling element, a through hole is disposed on an end of the stem, and the pulling element passes through the through hole and connects to the stem.

11. The linear actuator of claim 10, wherein the stem comprises an upright plate disposed on an end thereof passed through by the pulling element.

12. The linear actuator of claim 1, wherein the toggle restraining mechanism further comprises a fixing element, a through hole is disposed on the stem, a connecting hole is disposed on the rotating element, and the stem is connected to the rotating element by the fixing element passing the through hole and the connecting hole.

13. The linear actuator of claim 12, wherein the rotating element comprises a restraining rod and a swaying plate connected to the restraining rod, the restraining hole is disposed on the restraining rod, and the rotating arm is disposed on the swaying plate.

14. The linear actuator of claim 13, wherein the restraining presser comprises a restraining cylinder and a pressing plate connected with the restraining cylinder, the restraining cylinder is positioned on the restraining rod, and the restraining spring and the engaging element are disposed in the restraining cylinder.

15. The linear actuator of claim 14, wherein the restraining assembly further comprises an adjusting screw and multiple fixing screws, an adjusting hole is disposed on the restraining cylinder, the adjusting screw is inserted into the adjusting hole and abuts against the restraining spring, a fixing hole is disposed on two sides of the pressing plate respectively, and the restraining presser is fixed by the fixing screws being associated with the fixing holes.

16. The linear actuator of claim 1, wherein the engaging element comprises a steel ball.

17. The linear actuator of claim 1, further comprising: a telescopic tube, connected to the screw rod.

* * * * *